Patented June 7, 1949

2,472,589

UNITED STATES PATENT OFFICE 2,472,589

POLYMERIZATION OF ALPHA ALKYL STYRENES

Arthur B. Hersberger, Drexel Hill, Pa., assignor to The Atlantic Refining Company, Philadelphia, Pa., a corporation of Pennsylvania No Drawing. Application April 18, 1946, Serial No. 663,249

11 Claims. (Cl. 260—93.5)

The present invention relates to the polymerization of unsaturated compounds to form useful resinous materials, and relates more particularly to the polymerization of an alpha alkyl styrene, mixtures of alpha alkyl styrenes, or polymerizable mixtures containing substantial quantities of an alpha alkyl styrene.

An object of this invention is the production of resinous materials by the polymerization of alpha alkyl styrenes in the presence of an active Friedel-Crafts type catalyst and a diluent comprising an inert liquid polysiloxane, at a temperature below 10° C. and preferably between —50° C. and the freezing point of diluted reactants.

It has been proposed heretofore to effect polymerization of alpha alkyl styrene and its homologues in the presence of a Friedel-Crafts type catalyst and a diluent such as halogenated hydrocarbons, i. e., the lower alkyl chlorides such as ethyl chloride and the like. While it was possible to produce substantially solid resins at relatively low temperatures by this method, it was found that the alkyl chloride had a tendency to inhibit extended polymerization either by causing stoppage of the chain reaction or by entering such reaction and becoming a part of the polymer molecule. Regardless of the exact cause, the use of the alkyl halide as a diluent resulted in the formation of polymers having a molecular weight considerably lower than that of polymers produced in the presence of a liquid polysiloxane at temperatures at which such diluent may be effectively employed.

I have found that by using as a diluent for the alpha alkyl styrene or mixture of alpha alkyl styrenes, a liquid polysiloxane which is substantially inert and does not itself polymerize, or copolymerize with the alpha alkyl styrene, or interfere with the polymerization of the alpha alkyl styrene in the presence of a Friedel-Crafts catalyst at temperatures below 10° C. and preferably below —50° C., I am able to obtain not only an increase in molecular weight of the polymers but also an improved structure of the solid polymer particles which renders them more easily removable from the polymerization reaction mixture by filtration, as compared with polymers produced in the presence of diluents such as the lower alkyl halides, and especially ethyl chloride.

The polysiloxanes which may be employed as diluents in accordance with this invention are preferably those derived from the lower alkyl chlorsilanes such as dimethyl dichlorsilane, trimethyl chlorsilane, diethyl dichlorsilane, triethyl chlorsilane, dipropyl dichlorsilane, tripropyl chlorsilane, and the like, or mixtures of such chlorsilanes. The monochlorsilanes, when treated with water, alcohols, or aqueous alkali solutions, are converted first to the trialkyl silicols, which upon loss of one molecule of water, form the trialkyl siloxane dimers. The dialkyl dichlorsilanes, when subjected to similar treatment, first form dialkyl silicols, which upon the loss of water, form linear siloxane polymers of varying chain length and molecular weight. Mixtures of the dialkyl dichlorsilanes and trialkyl monochlorsilanes, would, of course, produce mixed polysiloxanes, or mixtures of silicones. The formation of the polysiloxanes through the action of moisture upon the alkyl chlorsilanes is beneficially affected by the application of heat. Typical of the liquid polysiloxanes which may be used as diluents in accordance with the present invention are those produced from diethyl dichlorsilane and triethyl chlorsilane. Commercially available polysiloxanes which may be used are the Dow-Corning type 500 fluid silicones. The properties of these polysiloxanes are as follows:

| Viscosity at 25° C., Centistokes | Boiling Point, ° C. (760 mm.) | Freezing Point, ° C. | Specific Gravity at 25° C. |
|---|---|---|---|
| 0.65 | 99.5 | —68 | 0.7606 |
| 1.00 | 152.0 | —85 | 0.8182 |
| 1.50 | 192.0 | —76 | 0.8516 |
| 2.00 | 230.0 | —84 | 0.8710 |

The above polysiloxanes are exemplary of those especially useful in the practice of this invention. However, it is to be understood that any polysiloxanes which are liquid at the operating conditions, inert in the polymerization reaction, and have the requisite solvent properties for the alpha alkyl styrenes, may be employed in accordance with the present invention. These diluents possess the advantage of rapidly and completely precipitating the polymer in the form of a finely divided solid which may be readily separated by filtration. This is in direct contrast to the lower alkyl halides which invariably hold a portion of the polymer in solution and are themselves included in the precipitated polymer. The quantity of liquid polysiloxane employed as a diluent may vary from about 1 to 25 volumes per volume of alpha alkyl styrene or of polymerizable mixtures containing an alpha alkyl styrene, depending principally upon the temperature and degree of polymerization desired. Quantities of diluent between 1 and 10 volumes per volume of alpha alkyl styrene are preferred. For example, satisfactory polymerization of alpha methyl styrene at −50° C. in the presence of AlCl₃ was obtained when the alpha methyl styrene was diluted with 1 volume of polysiloxane. On the other hand, at lower temperatures a greater dilution is maintained, for example, alpha methyl styrene diluted with 5 volumes of polysiloxane may be successfully polymerized with a TiCl₄ catalyst at −80° C. to yield a relatively high molecular weight resin.

The present process is applicable to the homopolymerization of an alpha alkyl styrene or to the copolymerization of two or more alpha alkyl styrenes. As herein used, the term "alpha alkyl styrene" includes any styrene represented by the formula:

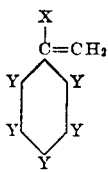

wherein X may be an alkyl group such as methyl, ethyl, propyl, or isopropyl, etc., but is preferably methyl, and wherein Y may be hydrogen or alkyl, and is preferably hydrogen or methyl.

The process of the present invention is particularly applicable to the production of polymers or copolymers of very high molecular weight, which necessitates the employment of low temperatures, preferably between −50° C. and −80° C., the lower the temperature, the higher the molecular weight attained.

In operating with active Friedel-Crafts type catalysts, it has been found advantageous to first dissolve or disperse the catalyst in a suitable solvent, such as a polysiloxane, or carbon disulfide, or a lower alkyl halide, for example, methyl chloride, ethyl chloride, propyl chloride, or isopropyl chloride before bringing it into contact with the alpha alkyl styrene or styrenes to be polymerized. The catalyst solution is most suitably applied in the form of droplets, or as a mist or dispersion. Any suitable spraying or atomizing device having jets or orifices of proper restriction may be employed to produce the spray or mist, which may be injected on or under the surface of the reactant mixture. In general, any liquid polysiloxane, or any alkyl halide of suitable freezing point and solvent power may be used as a catalyst solvent, although chlorides are preferred over the corresponding bromides, iodides, and fluorides. Various Friedel-Crafts type catalysts may be satisfactorily employed, including AlCl₃, AlBr₃, ZnCl₂, TiCl₄, SnCl₄, and BF₃, preference being had for TiCl₄ since it is more soluble in the various solvents, and particularly the polysiloxanes, than the other catalysts mentioned.

In the practice of the invention, a solution of the catalyst in the solvent is first made up at ordinary room temperature, a liquid polysiloxane being the preferred solvent. The concentration of the catalyst in the solution may vary between relatively wide limits, concentrations between 0.25% and 1% being satisfactory, although higher concentrations may be utilized, i. e., up to about 5%. The catalyst solution is then cooled by appropriate means such as by the use of carbon dioxide, or liquefied nitrogen, or liquefied normally gaseous hydrocarbons, for example, ethane, ethylene, or propane to approximately the temperature at which it is desired to carry out the polymerization. The refrigerant used in the cooling of the solution may be applied either externally or internally, but best results have been obtained using the refrigerant externally. Following the cooling operation, the solution in the form of a spray or mist produced by a suitable atomizing device is brought into contact with the alpha alkyl styrene or styrenes to be polymerized, said styrene or styrenes being diluted with a suitable quantity of liquid polysiloxane and precooled to substantially the temperature at which it is desired to effect the polymerization. The appropriate polymerization temperature may be maintained by any suitable means, for example, indirect heating exchange with solid carbon dioxide, liquefied nitrogen, or liquefied normally gaseous hydrocarbons. During the polymerization, the reaction mixture is usually kept under constant agitation not only as an aid to temperature control but also to prevent discoloration of the polymer. At temperatures of the order of −50° C. to −80° C., the polymer generally forms a slurry of solid particles which may be removed from the reaction mixture by any appropriate means, for example, by decantation or filtration. The complex formed between the catalyst (particularly AlCl₃) and the polymer may be decomposed either prior to filtration or subsequently by the addition of agents such as water, or alcohol, or ammonia. The lower aliphatic alcohols such as methyl, ethyl, propyl, and isopropyl are particularly useful in this respect. The polymers may be purified by washing thoroughly with a low boiling petroleum naphtha or similar agent prior to drying.

The present invention may be further illustrated by the following example, which, however, is not to be taken as limiting the scope thereof:

100 volumes of alpha methyl styrene was diluted with 100 volumes of a liquid polysiloxane having a viscosity of 0.65 centistoke at 25° C., and the solution was cooled to −60° C. by the direct addition of solid carbon dioxide. 50 volumes of a 2% solution of titanium tetrachloride in the same polysiloxane, pre-cooled to −60° C., was added dropwise to the well stirred alpha methyl styrene solution over a period of 10 minutes. An immediate precipitate of alpha methyl styrene polymer was formed in large amounts. Upon completion of the polymerization reaction, the solid polymer particles were filtered from the reaction mixture and washed with 200 volumes of 95% ethyl alcohol which destroyed any remaining catalytic activity. The polymer product was then steam distilled to remove traces of polysiloxane and alcohol, yielding a white granular mass which was readily molded to yield a clear, solid plastic mass.

While it is preferred to employ the spray technique in bringing the solution of the catalyst into contact with the diluted alpha alkyl styrene, especially where a high molecular weight polymer is desired, any other suitable method of contacting the reactant mixture with the catalyst solution may be employed. For example, the process may be executed by simply pouring the catalyst solution into the reactant mixture, the mixture preferably being vigorously agitated. Furthermore, while it is preferred to employ the catalyst in solution, the polymerization reaction may also be effected with the catalyst in the solid or gaseous state, for example, solid finely divided aluminum chloride, or gaseous boron fluoride.

While the present invention has been described particularly with reference to the polymerization of alpha methyl styrene, such invention is equally well adapted in the polymerization of other alpha alkyl styrenes, such as alpha methyl para methyl styrene, alpha methyl para ethyl styrene, alpha methyl para isopropyl styrene, alpha methyl para propyl styrene, alpha methyl meta methyl styrene, alpha ethyl styrene, alpha ethyl para ethyl styrene, and the like.

For brevity in the appended claims, the term "liquid polysiloxane" comprehends polyalkylpolysiloxanes having an alkyl hydrocarbon to silicon ratio of 2 or 3, or copolymers, or mixtures thereof, having melting points below 10° C. and preferably below —50° C.

I claim:

1. A process for polymerizing an alpha alkyl styrene, which comprises contacting said alpha alkyl styrene with a Friedel-Crafts catalyst in the presence of a solvent comprising an inert polyalkylpolysiloxane at a temperature below 10° C., said polyalkylpolysiloxane being liquid at the polymerizing temperature and having an alkyl hydrocarbon to silicon ratio between 2 and 3.

2. A process for polymerizing an alpha alkyl styrene, which comprises diluting said alpha alkyl styrene with an inert polyalkylpolysiloxane and contacting the resulting solution with a Friedel-Crafts catalyst at a temperature below —50° C., said polyalkylpolysiloxane being liquid at the polymerization temperature and having an alkyl hydrocarbon to silicon ratio between 2 and 3.

3. A process for polymerizing an alpha alkyl styrene, which comprises diluting said alpha alkyl styrene with an inert polyalkylpolysiloxane, the ratio of the former to the latter being between 1:1 and 1:25, and contacting the resulting solution with a Friedel-Crafts catalyst at a temperature below —50° C., said polyalkylpolysiloxane being liquid at the polymerization temperature and having an alkyl hydrocarbon to silicon ratio between 2 and 3.

4. A process for polymerizing an alpha alkyl styrene, which comprises diluting said alpha alkyl styrene with an inert polyalkylpolysiloxane, the ratio of the former to the latter being between 1:1 and 1:25, and contacting the resulting solution at a temperature below —50° C. with a Friedel-Crafts catalyst dissolved in an organic solvent, said polyalkylpolysiloxane being liquid at the polymerization temperature and having an alkyl hydrocarbon to silicon ratio between 2 and 3.

5. A process for polymerizing an alpha alkyl styrene, which comprises diluting said alpha alkyl styrene with an inert polyalkylpolysiloxane, the ratio of the former to the latter being between 1:1 and 1:25, and contacting the resulting solution, at a temperature between —50° C. and the freezing point of said solution, with a Friedel-Crafts catalyst dissolved in an inert polyalkylpolysiloxane, said polyalkylpolysiloxane being liquid at the polymerization temperature and having an alkyl hydrocarbon to silicon ratio between 2 and 3.

6. A process for polymerizing an alpha alkyl styrene, which comprises diluting said alpha alkyl styrene with an inert polyalkylpolysiloxane, the ratio of the former to the latter being between 1:1 and 1:25, contacting the resulting solution, at a temperature between —50° C. and the freezing point of said solution, with a Friedel-Crafts catalyst to effect polymerization, said polyalkylpolysiloxane being liquid at the polymerization temperature and having an alkyl hydrocarbon to silicon ratio between 2 and 3, commingling the polymer mixture with a lower aliphatic alcohol, and separating the solid polymers from the mixture.

7. A process for polymerizing an alpha alkyl styrene, which comprises diluting said alpha alkyl styrene with an inert polyalkylpolysiloxane, the ratio of the former to the latter being between 1:1 and 1:25, contacting the resulting solution at a temperature between —50° C. and the freezing point of said solution, with a solution of a Friedel-Crafts catalyst to effect polymerization, said polyalkylpolysiloxane being liquid at the polymerization temperature and having an alkyl hydrocarbon to silicon ratio between 2 and 3, commingling the polymer mixture with ethyl alcohol, and separating the solid polymers from the mixture.

8. A process for polymerizing alpha methyl styrene, which comprises contacting said alpha methyl styrene with a Friedel-Crafts catalyst in the presence of a solvent comprising an inert polyalkylpolysiloxane at a temperature below 10° C., said polyalkylpolysiloxane being liquid at the polymerization temperature and having an alkyl hydrocarbon to silicon ratio between 2 and 3.

9. A process for polymerizing alpha methyl styrene, which comprises diluting said alpha methyl styrene with an inert polyalkylpolysiloxane, and contacting the resulting solution with a Friedel-Crafts catalyst at a temperature below —50° C., said polyalkylpolysiloxane being liquid at the polymerization temperature and having an alkyl hydrocarbon to silicon ratio between 2 and 3.

10. A process for polymerizing alpha methyl styrene, which comprises contacting said alpha methyl styrene with $AlCl_3$ in the presence of a solvent comprising an inert polyalkylpolysiloxane at a temperature below 10° C., said polyalkylpolysiloxane being liquid at the polymerization temperature and having an alkyl hydrocarbon to silicon ratio between 2 and 3.

11. A process for polymerizing alpha methyl styrene, which comprises contacting said alpha methyl styrene with $TiCl_4$ in the presence of a solvent comprising an inert polyalkylpolysiloxane at a temperature below 10° C., said polyalkylpolysiloxane being liquid at the polymerization temperature and having an alkyl hydrocarbon to silicon ratio between 2 and 3.

ARTHUR B. HERSBERGER.

REFERENCES CITED

The following references are of record in the file of this patent:

FOREIGN PATENTS

| Number | Country | Date |
|---|---|---|
| 524,156 | Great Britain | July 31, 1940 |

OTHER REFERENCES

Chemical and Eng. News, vol. 24, No. 9, May 10, 1946, pp. 1233 and 1234.

Rochow: Chemistry of the Silicones, Wiley, 1946, pp. 58, 59, 64 and 65.

Evison et al.: Journ. of the Chemical Soc., vol. 134, pp. 2774-8 (1931).

Certificate of Correction

Patent No. 2,472,589

June 7, 1949

ARTHUR B. HERSBERGER

It is hereby certified that error appears in the printed specification of the above numbered patent requiring correction as follows:

Column 2, line 13, for the word "silicones" read *polysiloxanes*; and that the said Letters Patent should be read with this correction therein that the same may conform to the record of the case in the Patent Office.

Signed and sealed this 13th day of December, A. D. 1949.

[SEAL]

THOMAS F. MURPHY,
*Assistant Commissioner of Patents.*